United States Patent
Di Felice et al.

(10) Patent No.: US 11,079,105 B2
(45) Date of Patent: Aug. 3, 2021

(54) WOODY BIOMASS COGENERATION PLANT FOR THE CONTINUOUS PRODUCTION OF HEAT AND ELECTRICITY

(71) Applicant: RESET S.R.L., Rome (IT)

(72) Inventors: Luciano Di Felice, Rome (IT); Stefano Manelfi, Rome (IT); Valerio Manelfi, Rome (IT); Emanuele Melchiorri, Rome (IT)

(73) Assignee: RESET S.R.L., Rome (IT)

( * ) Notice: Subject to any disclaimer, the term of this patent is extended or adjusted under 35 U.S.C. 154(b) by 0 days.

(21) Appl. No.: 16/347,968

(22) PCT Filed: Oct. 12, 2017

(86) PCT No.: PCT/IB2017/056301
§ 371 (c)(1),
(2) Date: May 7, 2019

(87) PCT Pub. No.: WO2018/083554
PCT Pub. Date: May 11, 2018

(65) Prior Publication Data
US 2019/0293283 A1    Sep. 26, 2019

(30) Foreign Application Priority Data
Nov. 7, 2016 (IT) .................. 102016000111822

(51) Int. Cl.
*F23G 5/027* (2006.01)
*F23G 5/00* (2006.01)
(Continued)

(52) U.S. Cl.
CPC ............ *F23G 5/027* (2013.01); *F23G 5/006* (2013.01); *F23G 5/38* (2013.01); *F23G 5/40* (2013.01);
(Continued)

(58) Field of Classification Search
CPC . F23G 5/027; F23G 5/40; F23G 5/006; F23G 5/38; F23G 7/10; F23G 7/105;
(Continued)

(56) References Cited

U.S. PATENT DOCUMENTS

| | | | |
|---|---|---|---|
| 8,739,708 B2 * | 6/2014 | Rabiner | F23G 5/006 110/341 |
| 9,593,286 B2 * | 3/2017 | Yang | F22B 1/18 |
| 10,113,125 B2 | 10/2018 | Yang et al. | |
| 2003/0196517 A1 * | 10/2003 | Harada | B09C 1/06 75/401 |

(Continued)

FOREIGN PATENT DOCUMENTS

| | | |
|---|---|---|
| EP | 1354646 A1 | 10/2003 |
| EP | 2843031 A1 | 3/2015 |

(Continued)

OTHER PUBLICATIONS

International Search Report and Written Opinion, dated Feb. 21, 2018, from corresponding PCT application No. PCT/IB2017/056301.

*Primary Examiner* — David J Laux
(74) *Attorney, Agent, or Firm* — Nixon & Vanderhye

(57) ABSTRACT

Cogeneration plant for the continuous production of electrical and thermal energy from solid woody biomass, the latter being selected from among wood in the form of woodchips, vine branches, shrubs and underbrush, grain, hay, animal litter, suitably-treated muds, shells and kernels, suitably-treated husks, fibrous cultures and compositions thereof, the plant including at least one first container and at least one second container connected by at least one interconnection duct, the first container including the components suitable for inducing the transformation of the biomass into syngas including $H_2$ and CO; the plant providing for a particular step of screening, drying and briquette-making on board the machine of the solid woody starting biomass.

19 Claims, 15 Drawing Sheets

(51) Int. Cl.
*F23G 5/38* (2006.01)
*F23G 7/10* (2006.01)
*F23G 5/40* (2006.01)

(52) U.S. Cl.
CPC .............. *F23G 7/10* (2013.01); *F23G 7/105* (2013.01); *F23G 2201/602* (2013.01); *F23G 2201/603* (2013.01); *F23G 2203/60* (2013.01); *F23G 2203/70* (2013.01); *F23G 2900/50002* (2013.01); *F23G 2900/50205* (2013.01); *Y02E 20/12* (2013.01); *Y02E 20/14* (2013.01); *Y02E 50/10* (2013.01)

(58) Field of Classification Search
CPC .............. F23G 2203/60; F23G 2203/70; F23G 2900/50205; Y02E 50/10; Y02E 20/14
See application file for complete search history.

(56) References Cited

U.S. PATENT DOCUMENTS

| | | | | |
|---|---|---|---|---|
| 2009/0090282 | A1* | 4/2009 | Gold | F23G 5/02 110/229 |
| 2010/0293853 | A1* | 11/2010 | Feerer | C10K 1/103 48/76 |
| 2016/0169581 | A1* | 6/2016 | Kotyk | C10L 5/363 44/590 |

FOREIGN PATENT DOCUMENTS

| | | |
|---|---|---|
| EP | 3029372 A1 | 6/2016 |
| WO | 2007/037768 A1 | 4/2007 |
| WO | 2015/105732 A1 | 7/2015 |

* cited by examiner

WOODY BIOMASS COGENERATION PLANT FOR THE CONTINUOUS PRODUCTION OF HEAT AND ELECTRICITY

FIELD OF THE ART

The present invention refers to the field of systems for energy recovery and savings. More in detail the present description refers to the field of cogeneration systems for the continuous production of electrical and thermal energy and in particular to micro-cogeneration plant systems which use solid biomasses as starting fuel. Still more in detail, the present invention regards a particular micro-cogeneration plant, fed with solid biomass, which is characterized in that it comprises particular components which allow optimizing the characteristics of the biomass for an improved performance thereof and for the optimization of the entire plant operation.

STATE OF THE ART

Up to now, most of the electrical energy generated globally comes from thermal motor plants. In these plants, the heat produced is first converted into mechanical energy and subsequently into electrical energy by means of the use of electrical generators. The heat used can come from various types of plants. By way of a non-limiting example, from nuclear power plants, hence from fission reactions, or more simply from thermo-electric power plants and in particular from the combustion of the fuel introduced, generally consisting of carbon substances of various type, such as fractions of oil, biomasses, coal, etc.

It is known that the process of conversion of heat into mechanical energy occurs with substantially complex thermodynamic cycles. At any rate, and independent of the cycle initiated, the second law of thermodynamics prevents the transformation from being complete; indeed, in one of its most well-known formulations, said law affirms that "it is not possible to make a thermal machine with 100% efficiency". Carnot's theorem is consistent with this as it demonstrates that the thermal efficiency of a motor and hence its performance, or the energy quantity that is converted into work in a transformation of thermal energy into mechanical energy, assumes a limited value. This condition requires that not all the heat provided actually be transformed into work. It is in any case clear that the energy surplus is not "lost", as is well known from the first law of thermodynamics. More in detail, the energy quantity not used for the transformation is yielded by the thermodynamic cycle in the form of heat which is usually dispersed in the environment. In most cases, such energy quantity is non-negligible, but rather reaches quite considerable percentages. This condition has induced the technological development of the field of the present invention, the design and achievement of new and increasingly innovative plants with the intention of optimizing energy recovery and consequently reducing waste.

Cogeneration in fact has come to be with the intention of recovering and using most of the heat unused in a cycle of transformation of thermal energy into mechanical energy. Not by chance, in fact, said quantity can be employed for heating buildings or in an industrial setting in vapor form, or more simply for various civil uses. The range of performances is a function of the power of the cogeneration plants which, up to now, varies from a few kilowatts to several hundred kilowatts.

Of recent technological development is the field of cogeneration which uses as energy source that obtainable from plant biomasses. For example, the document EP 2 843 031 A1 describes a process and a system of cogeneration based on the gasification and methanation of biomasses such as rice, husks, hay and sawdust. The system of the abovementioned document more specifically comprises a gasification unit, a shift unit, a purification unit and a methane concentration unit.

Even if different types of biomass cogeneration plants can be found, there are no actually integrated and modular solutions which provide for arranging the biomass in situ, conferring optimal characteristics thereto for an equally-optimal conversion, as well as for the reproducibility of the yields. For example, if the biomass is represented by wood-chips, the current systems do not provide for the screening, drying, storage and formulation of the woodchips on board the machine. Usually, the screening and drying units for the fuel are assigned to specialized external plants which do not have an actual continuity with the actual gasification plant.

It is also to be considered that the current plants for gasification (step of the biomass cogeneration process) usually produce a considerable amount of tar (up to 5-6%) which must be periodically disposed of. This involves considerable environmental and management difficulties which in fact inhibit the development of the technology associated with this plant type and above all with the use thereof. The characteristics of the precursor used, and specifically of the woodchips, are therefore of primary importance for the efficiency of the entire process. Currently, there is still no market specialized enough to be able to provide the fuel as requested by the builders of the plants on the market today. This aspect, strongly contrasting with the requests of the builders of this plant type, involves the lack of wood-chips with uniformly distributed and definable structural characteristics. There is therefore a substantial failure of the plants which use woodchips for the production of syngas comprising $H_2$ and CO. The woody precursor, independent of the species to which it belongs, almost never meets the specifications required, neither with regard to size nor regarding humidity level and thus creates considerable plant operation problems.

For such purpose, the object of the present industrial invention patent application is to propose a particular cogeneration plant which uses woodchips as starting fuel and which is provided with a particular section for screening, drying and formulating the woody precursor, adapted to allow the obtainment of woodchips with optimal characteristics for high plant performance. Said plant further has particular components which, when suitably assembled together with other structures present, contribute to synergistically enhancing the functionality and effectiveness thereof. Said plant, the relative operation process, the particular components and their equally particular spatial arrangement will be described in detail hereinbelow.

DESCRIPTION OF THE INVENTION

The present description refers to a cogeneration plant for the continuous production of electrical and thermal energy, having nominal power that can vary up to hundreds of kW. Nevertheless, a description is provided herein of the plant with a nominal power of about 50 kW, by way of a non-limiting example of 49.8 kW. Said plant comprises integrated structural characteristics which allow overcoming all the current critical issues and disadvantages arising during the cogeneration processes associated with plants that use wood biomasses as starting fuel material.

Said cogeneration plant appears as a compact structure such to allow the arrangement of some of its structure components within an ocean container having size of 6 meters length by 2.5 meters width. More in detail said plant comprises at least two containers and in particular at least one first container and at least one second container, in which at least the following sections are identifiable: at least one storage section on board the machine with specific and essential functions of screening, drying, briquette formulation and storage of the fuel; at least one section for production and purification of the syngas; at least one section for cogeneration and thermal recovery, at least one section for the emergency flare, at least one interconnection board preferably situated in said first container and adapted to receive the cables of all the signals of the plant instrumentation. The connection with the main board, placed in the second container, is made through industrial connectors of quick type for plug & play installation.

The main electrical board is provided, in the standard configuration, inside the second container (having length of three meters and preferably but not exclusively placed at a distance of 1.5 meters from the first container set for containing some of the aforesaid sections, as will be more clearly described hereinbelow) adapted to also receive an operator station, and is such that it can also be situated inside a building present nearby, preferably situated at a distance of less than ten meters from said cogeneration plant. The present cogeneration plant can be delivered to users completely mounted, wired and tested, ready for connection with the power grid and with the terminals (flanges) of the client heat use systems, i.e. in plug & play mode.

Advantageously the installation of said plant does not require building works, nor protective shelter from weathering agents. It is entirely automated and therefore does not require the intervention of personnel. The reloading of the fuel can occur once every two days, both manually and automatically in accordance with the selection of the users.

The reloading times are widely sufficient for the drying of the fuel.

Advantageously, with respect to the current cogeneration plants of comparable nominal power, which use wood as fuel material, the present cogeneration plant does not produce discards that require disposal at a dump or with other systems that, sometimes, can also be costly: all the materials produced during operation are reused in the process.

Advantageously the drying of the load made in line, in the fuel storage, allows reducing the condensate produced by the plant down to zero.

Advantageously the feeding of the plant provides for at least a double possibility of selection, with regard to the format of the precursor of the syngas produced by said plant: by way of a non-limiting example, the fuel wood can appear both in the form of woodchips of virgin wood G30-G50 and in briquette form with diameter comprised between 2 and 6 cm, preferably of 4 cm, and thickness comprised between 0.5 cm and 4.5 cm, preferably with thickness comprised between 1 and 3 cm. Both the woodchips and the briquettes are made of virgin woody material coming from the undersieve of the woodchips or from pruning, also more finely ground, allowing the use of discard materials produced by the essential step of screening which makes the cogeneration plant particular overall and, as already mentioned, allows resolving upstream all the problems arising with cogeneration plants which use a woody starting material: a lack of structural uniformity and uniformity of the chemical-physical properties encounterable at the micro-structural level between its various components, with consequent variability of the yields and lack of reproducibility of the production cycles.

Advantageously the woodchips can be loaded as is since the screening on board the machine normalizes the size thereof, and in a few hours the drying brings the level of humidity back to that which is the optimal level for the plant.

Advantageously the geometry of the gasification reactors and the characteristics of the treatment section are such that the quantity of tar produced at normal operating conditions is practically zero, due the particular process conditions. In addition, the portion that must be separated during the starting step, even if minimal, is any case placed back in circulation into the load of wood where it is absorbed and newly gasified.

Advantageously the biochar produced and extracted by the plant is reusable as amendment for the soil.

Advantageously the possible liquid produced can also be recirculated within the reactor for controlling the temperature of the reduction zone, maximizing the production of molecular hydrogen.

Advantageously the material absorbed on the syngas filter, woodchips, can be recycled to the loading tank in order to then be newly gasified.

Advantageously the reactor provides for an automatic attachment for feeding the briquettes directly from the briquette preparation machine, with a special feed system that prevents air suction.

It should also be indicated that the particular spatial configuration of the components of the plant allows obtaining a high thermal recovery, to the benefit of the woodchips drying section. More specifically, also the heat emitted by the endothermic motor and by the generator is recovered for drying the woodchips, since the volume of air heated by such thermal waste is thrust by a ventilator to the drying section.

All the functions of the components present therein are governed by a PLC controlled by a distributed management system (I/O-link) that provides for the diagnostics and the calibration of each of the installed instruments, such as manostats, thermostats, etc.

DESCRIPTION OF THE PREFERRED EMBODIMENTS

The invention will be described in detail hereinbelow in one of its preferred embodiments and in reference to the enclosed figures, in which:

FIG. 1 shows a perspective view of the solid biomass cogeneration plant—such biomass represented by wood material—object of the present industrial invention patent application. More in detail, the figure in question shows that said plant 100 comprises at least two containers and in particular a first container 1' and a second container 1". Said containers are connectable by at least one interconnection duct 1'";

FIG. 2 shows a perspective view of the ocean container with service openings and support structural work for the apparatuses;

FIG. 3 shows a perspective view of the first section for storing, drying, screening and loading the solid biomass of woodchips to the gasification reactors 7. The following can be observed: the dryer 3 thermo-ventilated with hot air from hot water, the three-way vibrating sieve 4 adapted to allow the portion of fine material that passes through the sieves, i.e. the under-sieve, to be automatically unloaded in an underlying grinder 5 that prepares the material for the subsequent step of briquette-making. Said briquette-making step occurs due to a suitable integrated briquette machine 6, also comprised in said first storage section;

Figure 1:
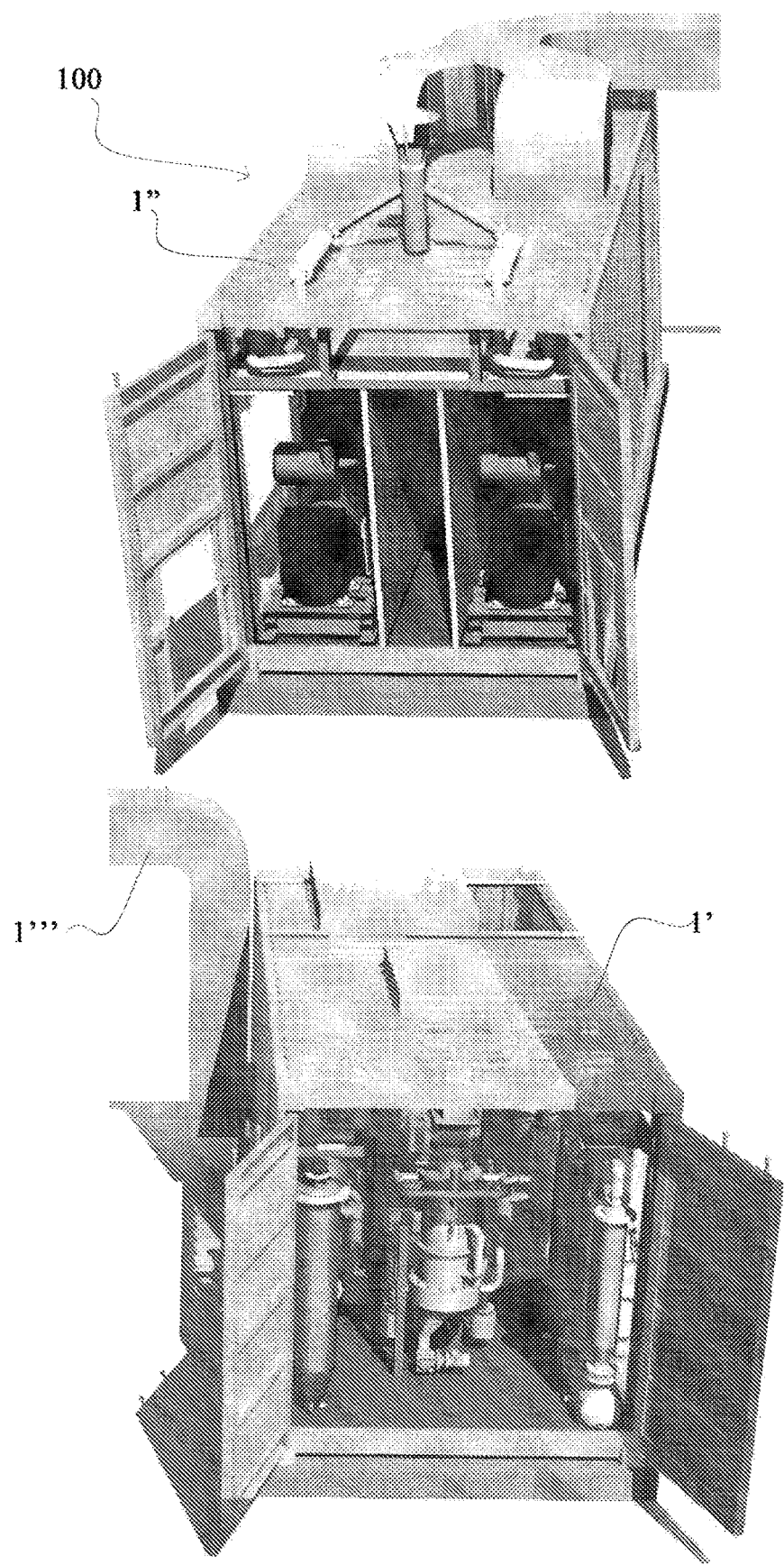
Figure 2:
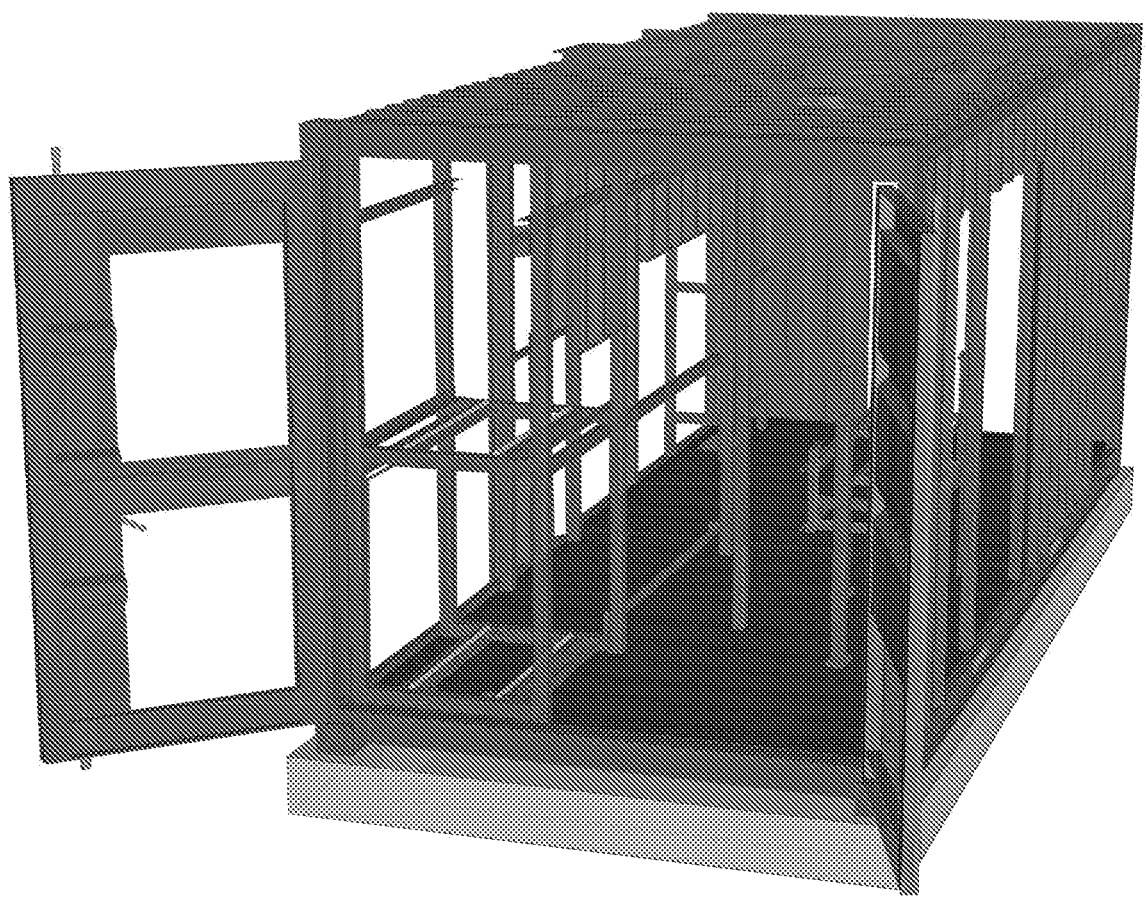
Figure 3:
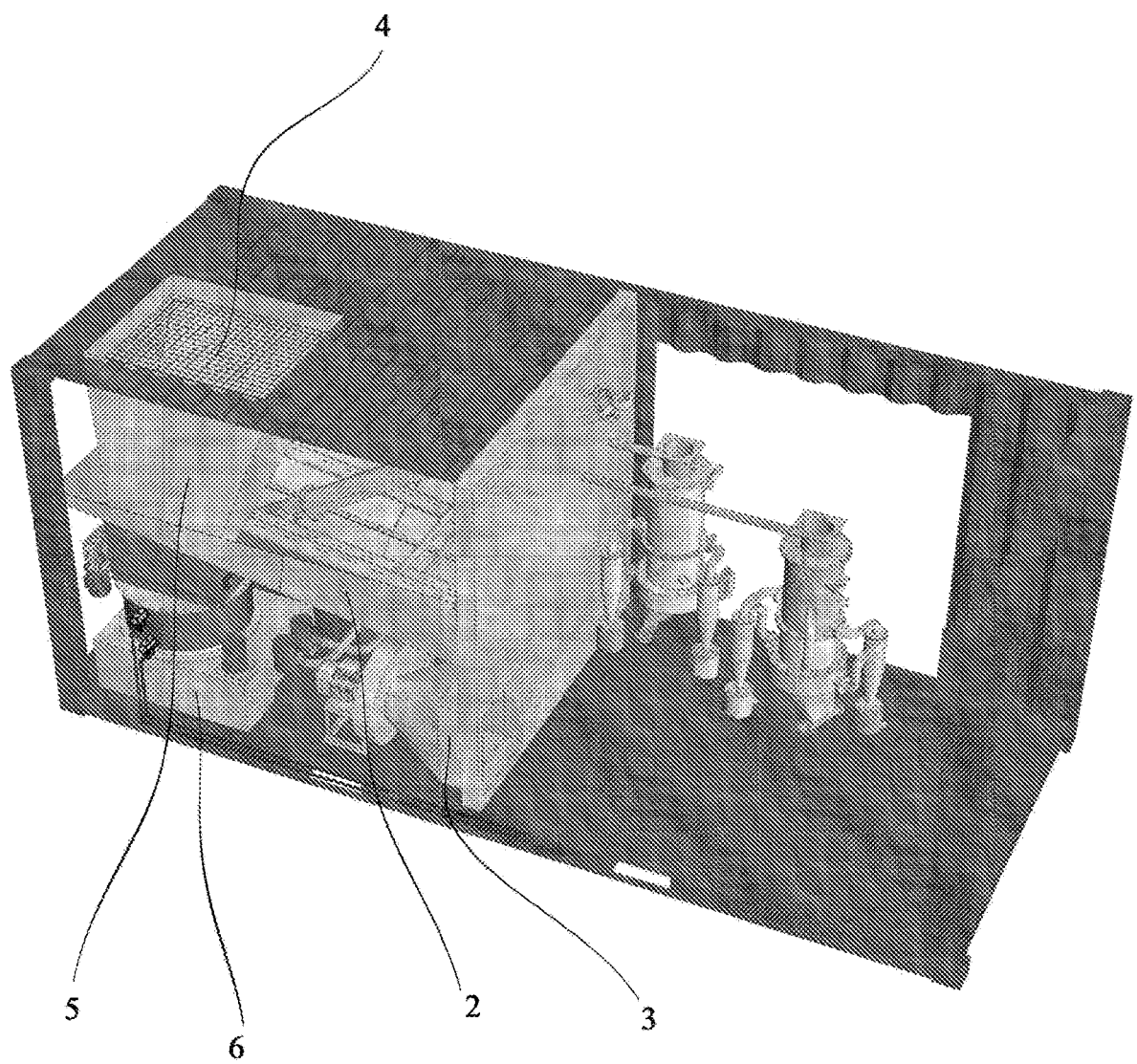
Figure 4:
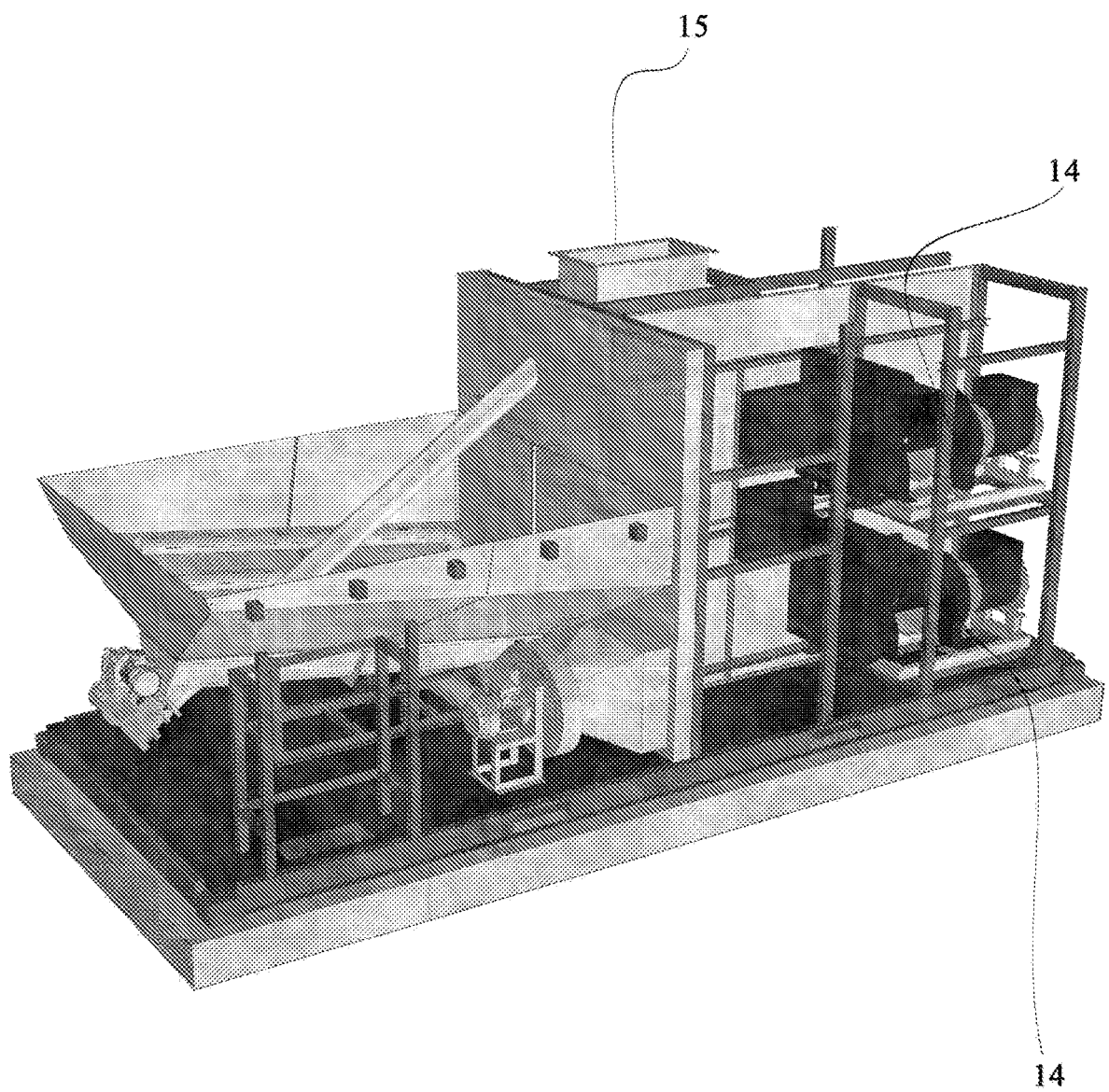
FIG. 4 shows the arrangement for the recovery of heat from motors 14 and radiators for the drying of the woodchips.
Figure 5:
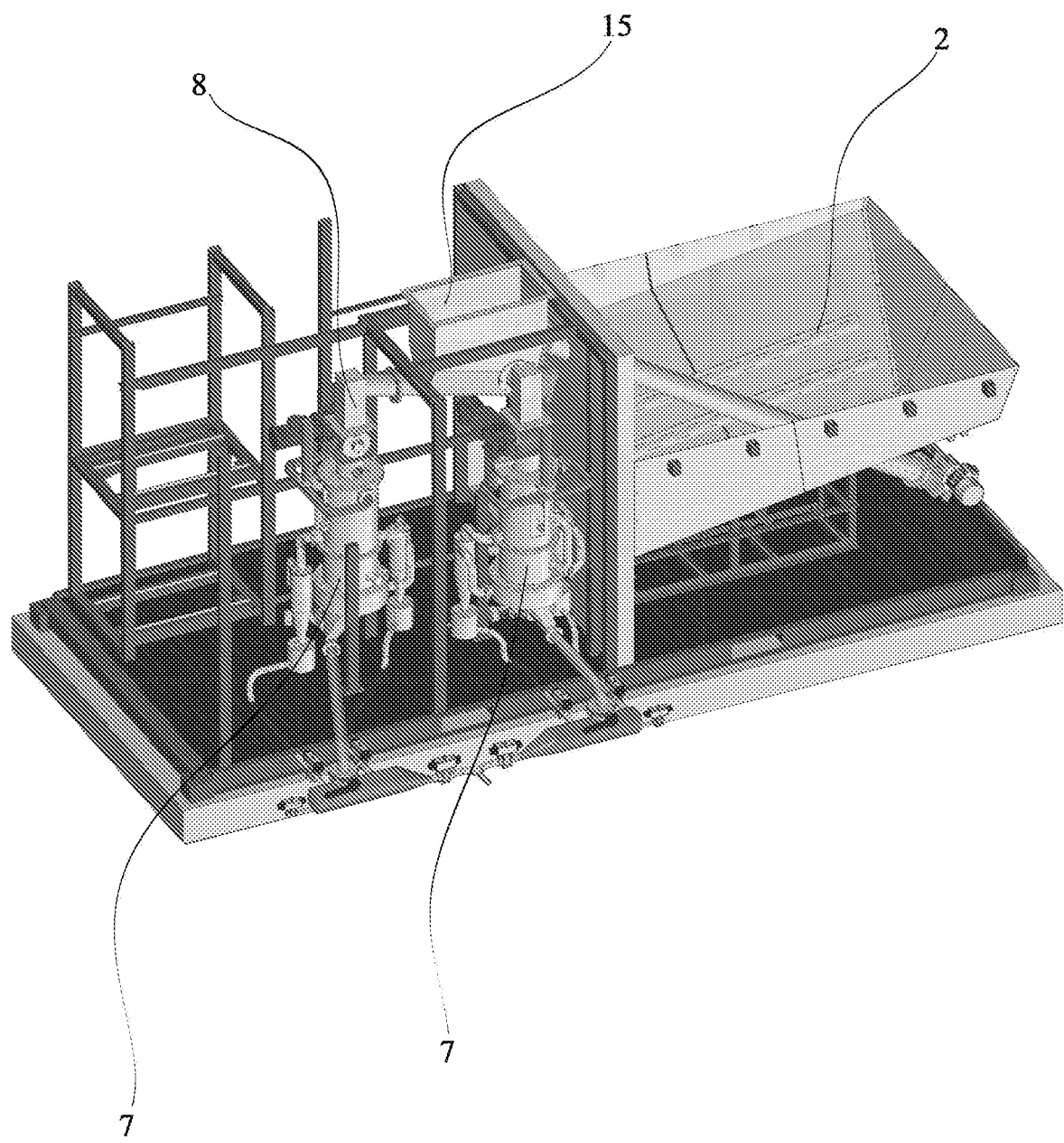
FIG. 5 shows a perspective view of the system of reactors 7 for gasification and extraction of the biochar.
Figure 6:
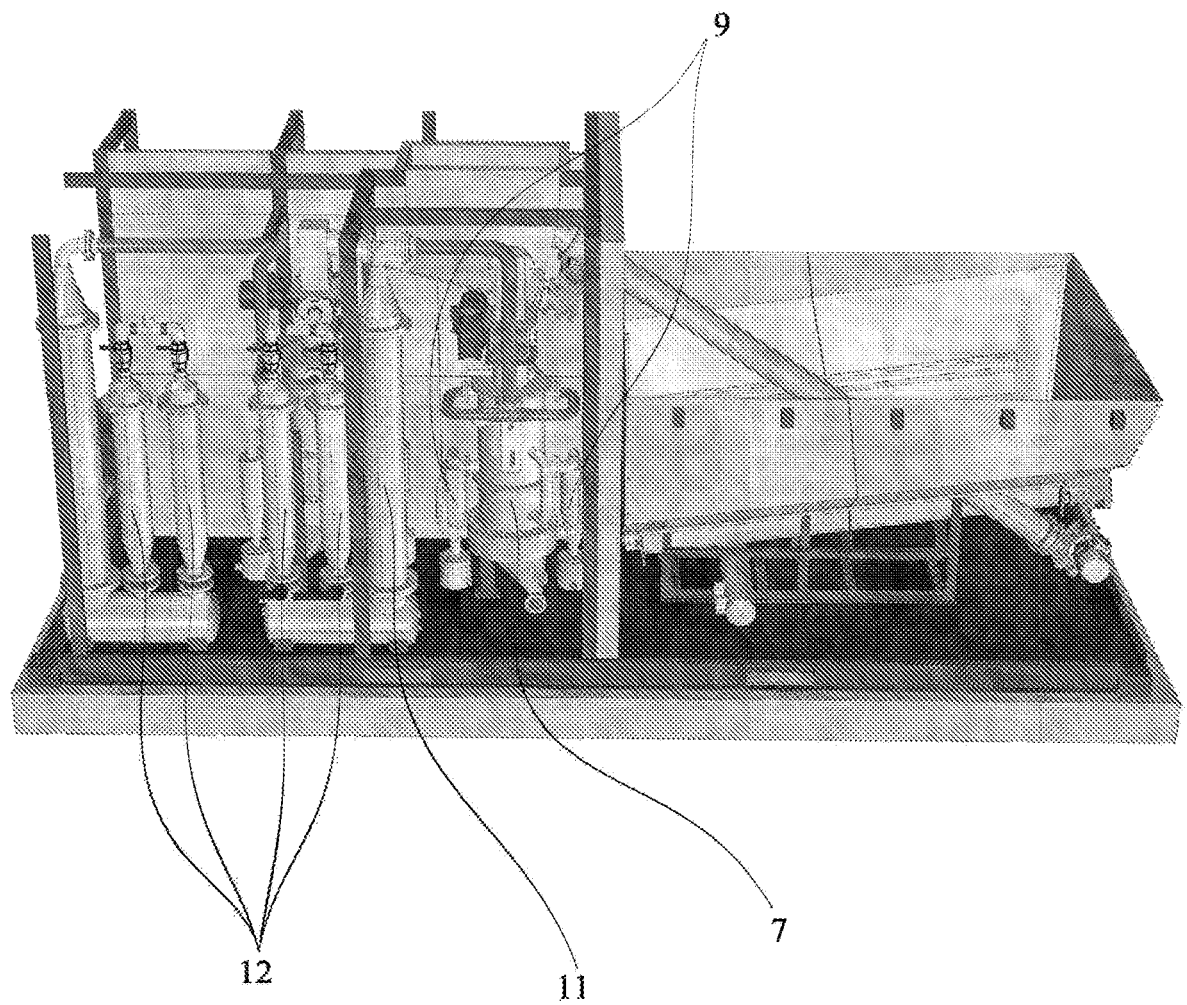
Figure 7:
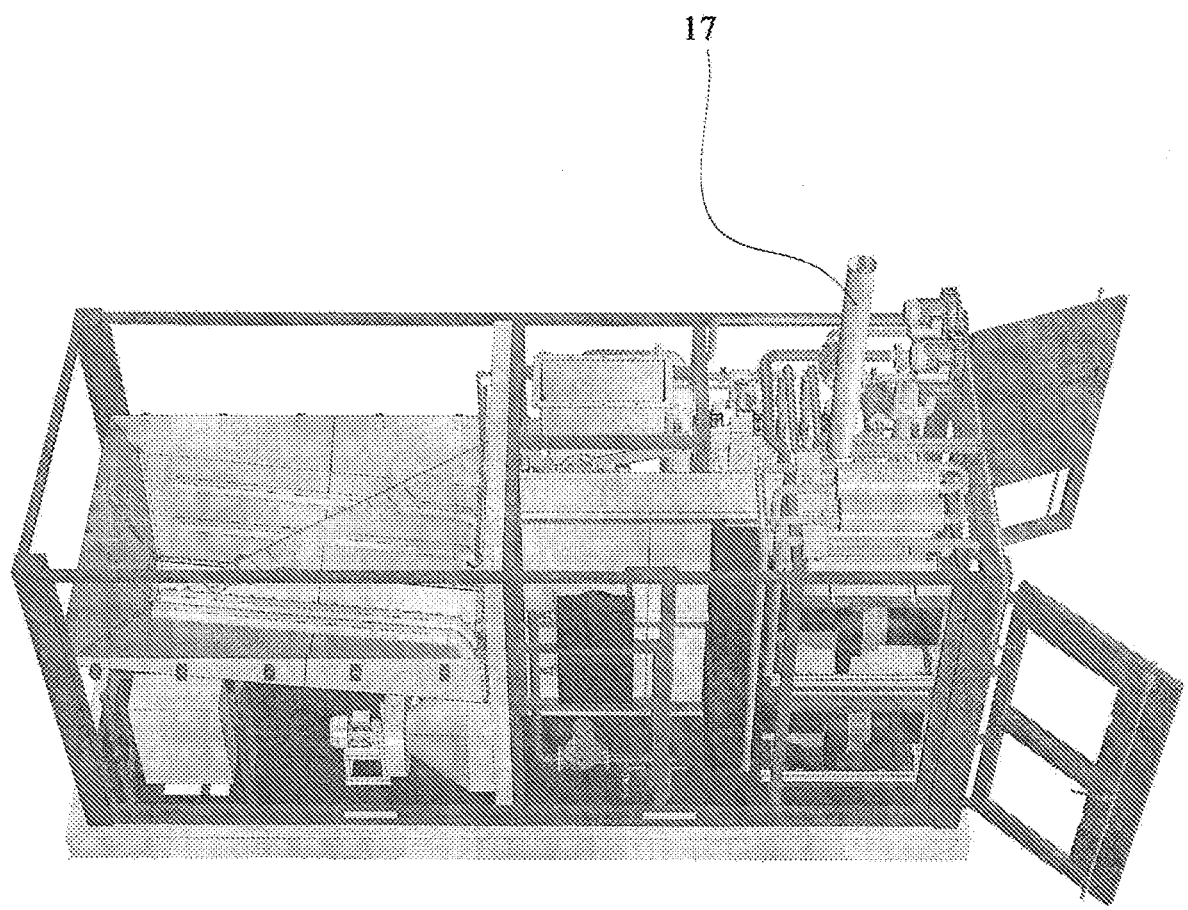
Figure 8:
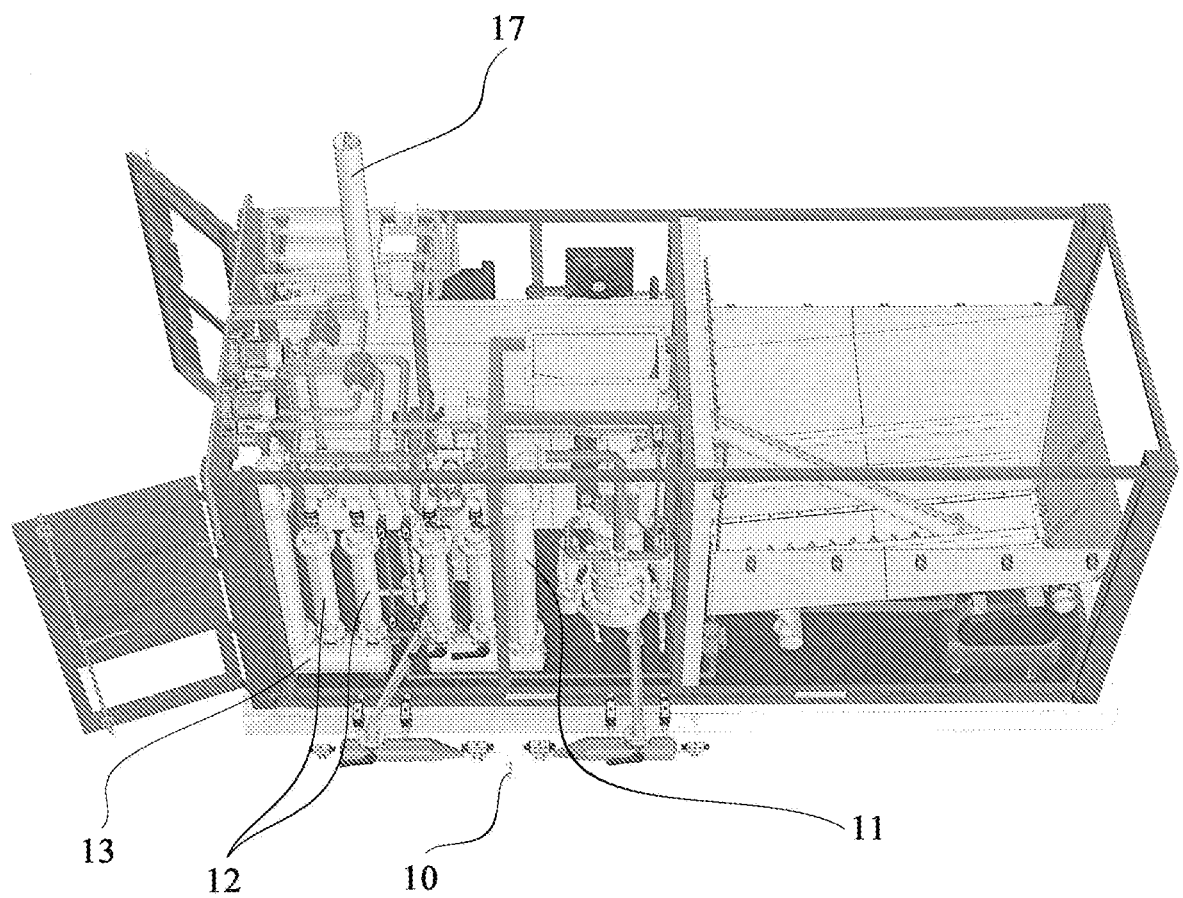
Figure 9:
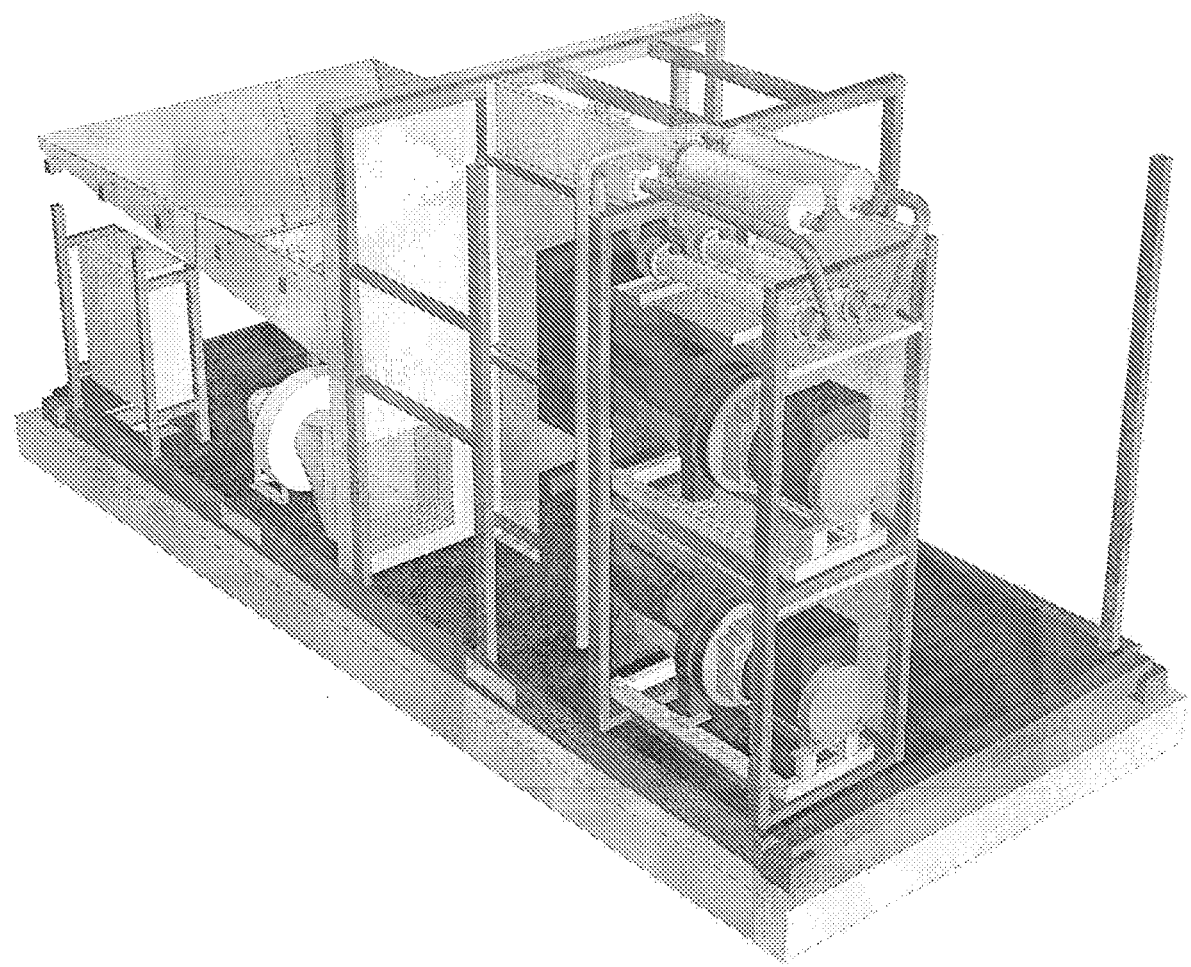
Figure 10:
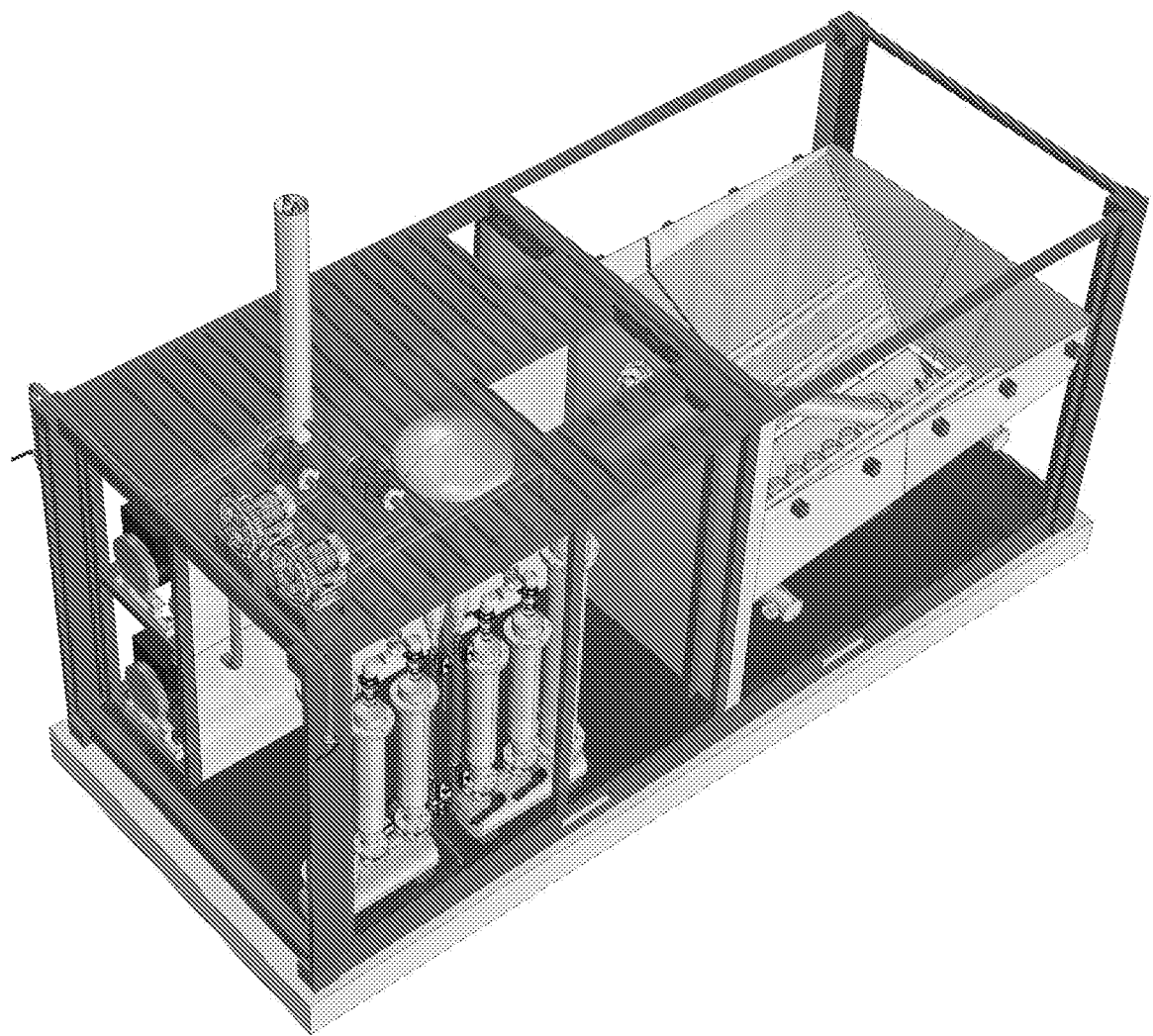
Figure 11:
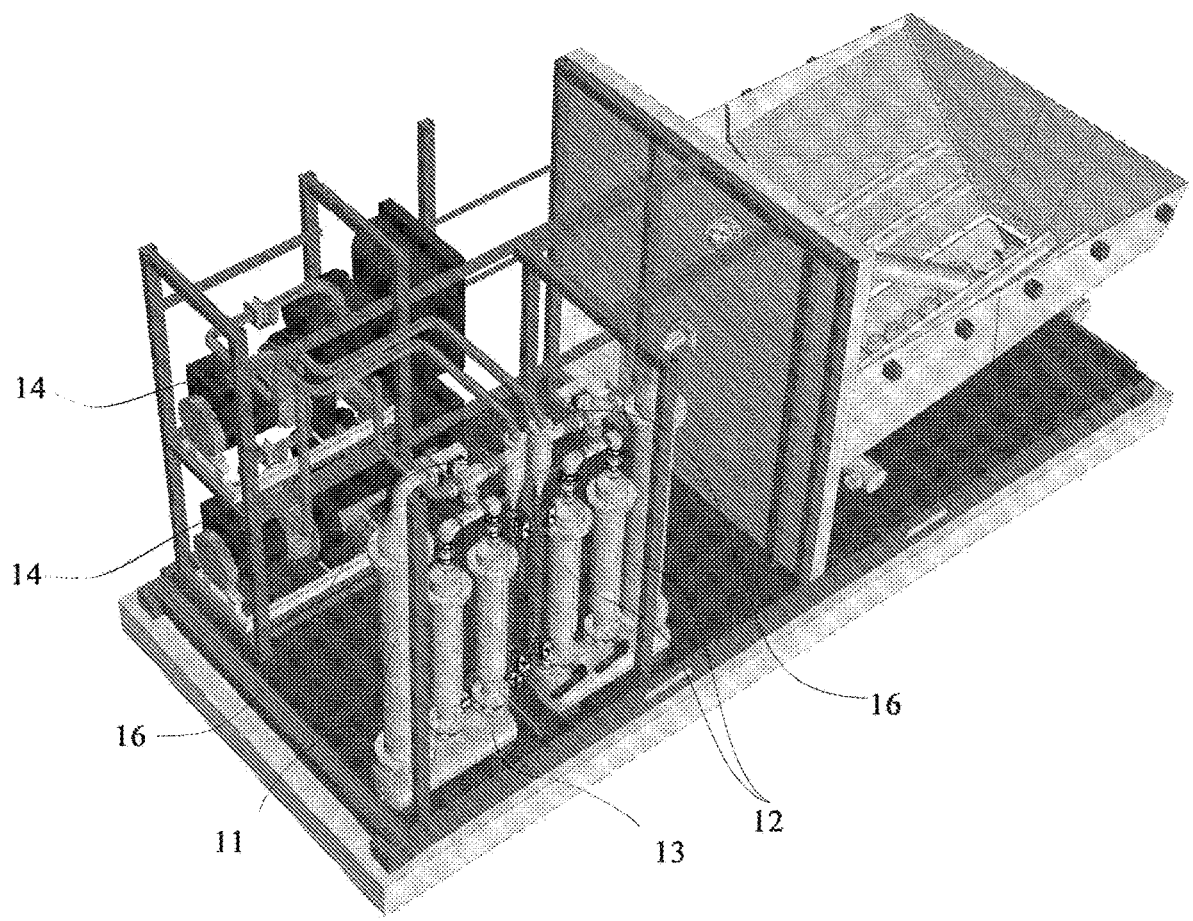
Figure 12:
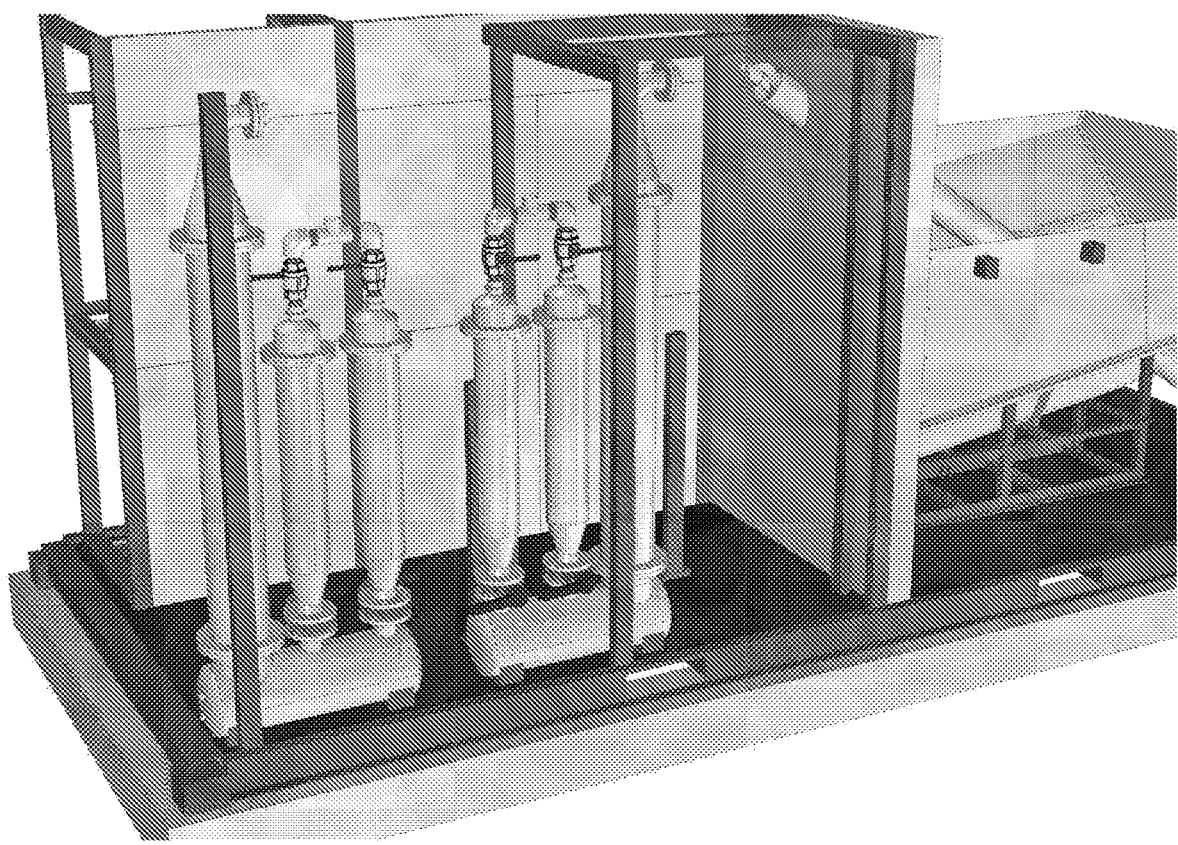
Figure 13:
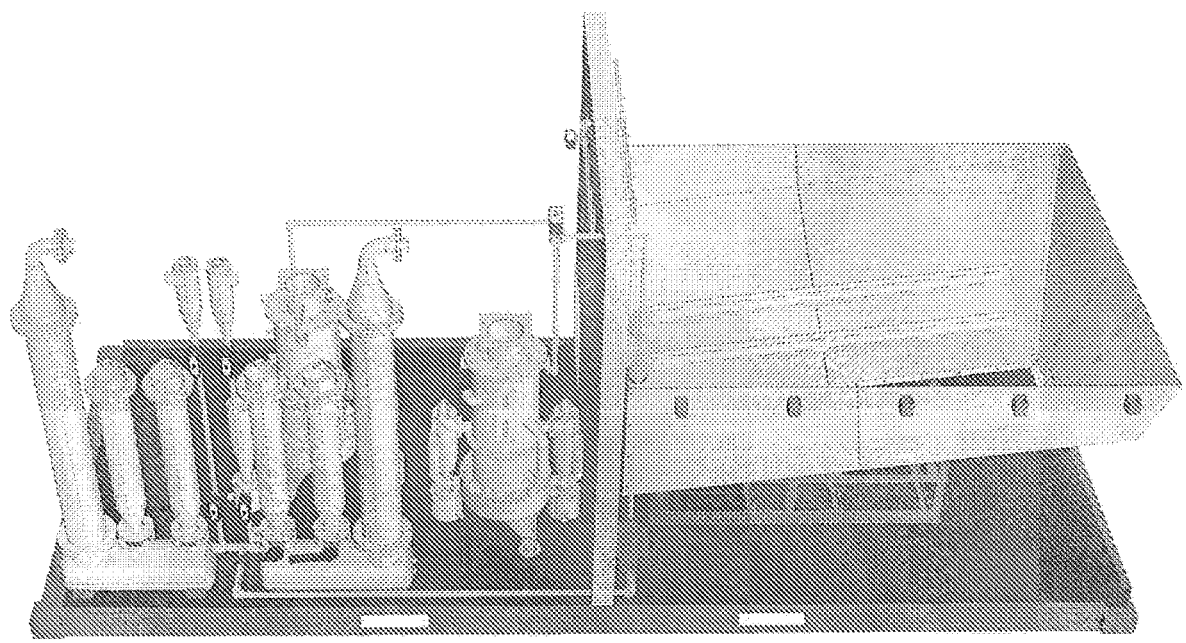
Figure 14:
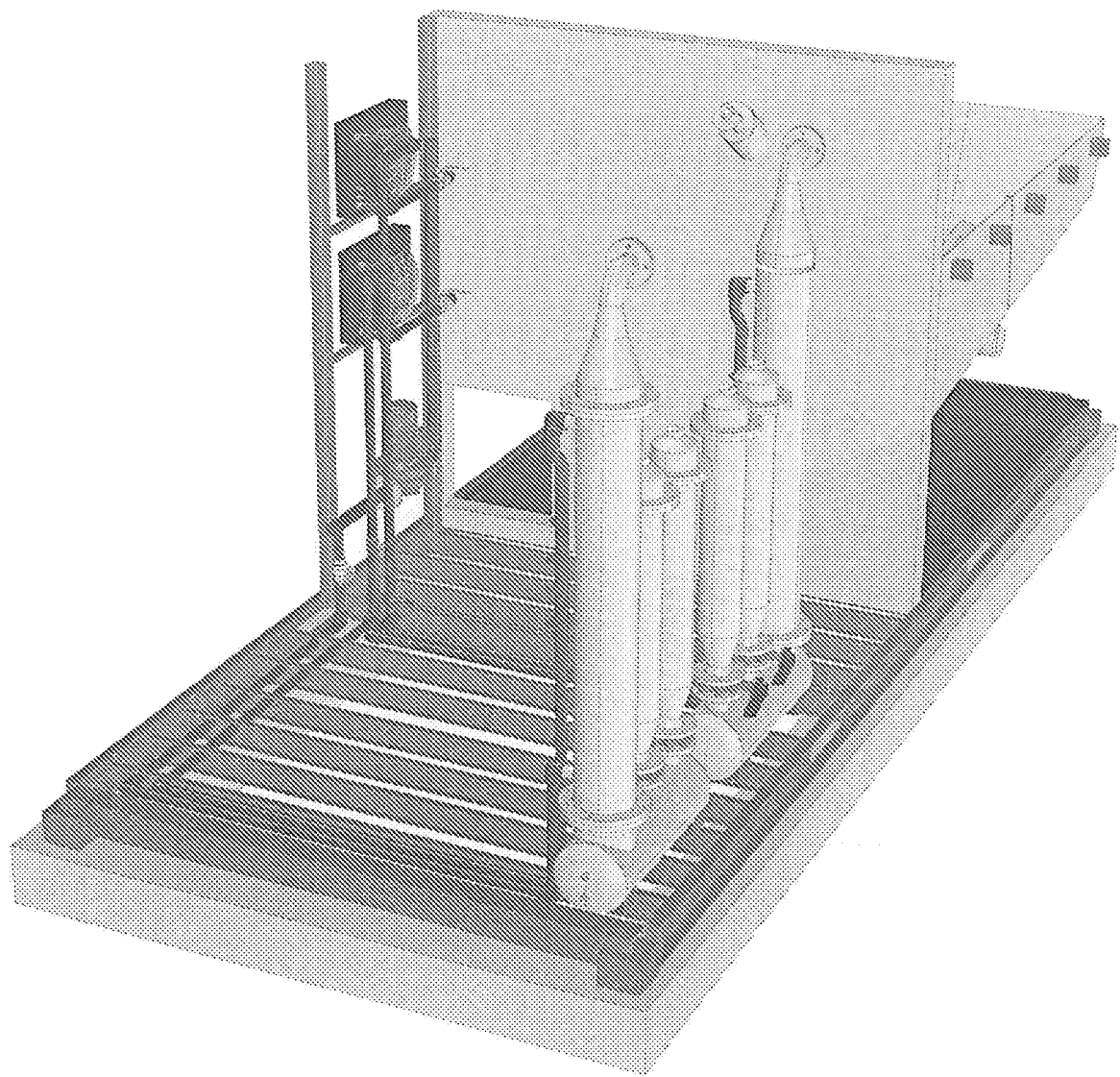
Figure 15:
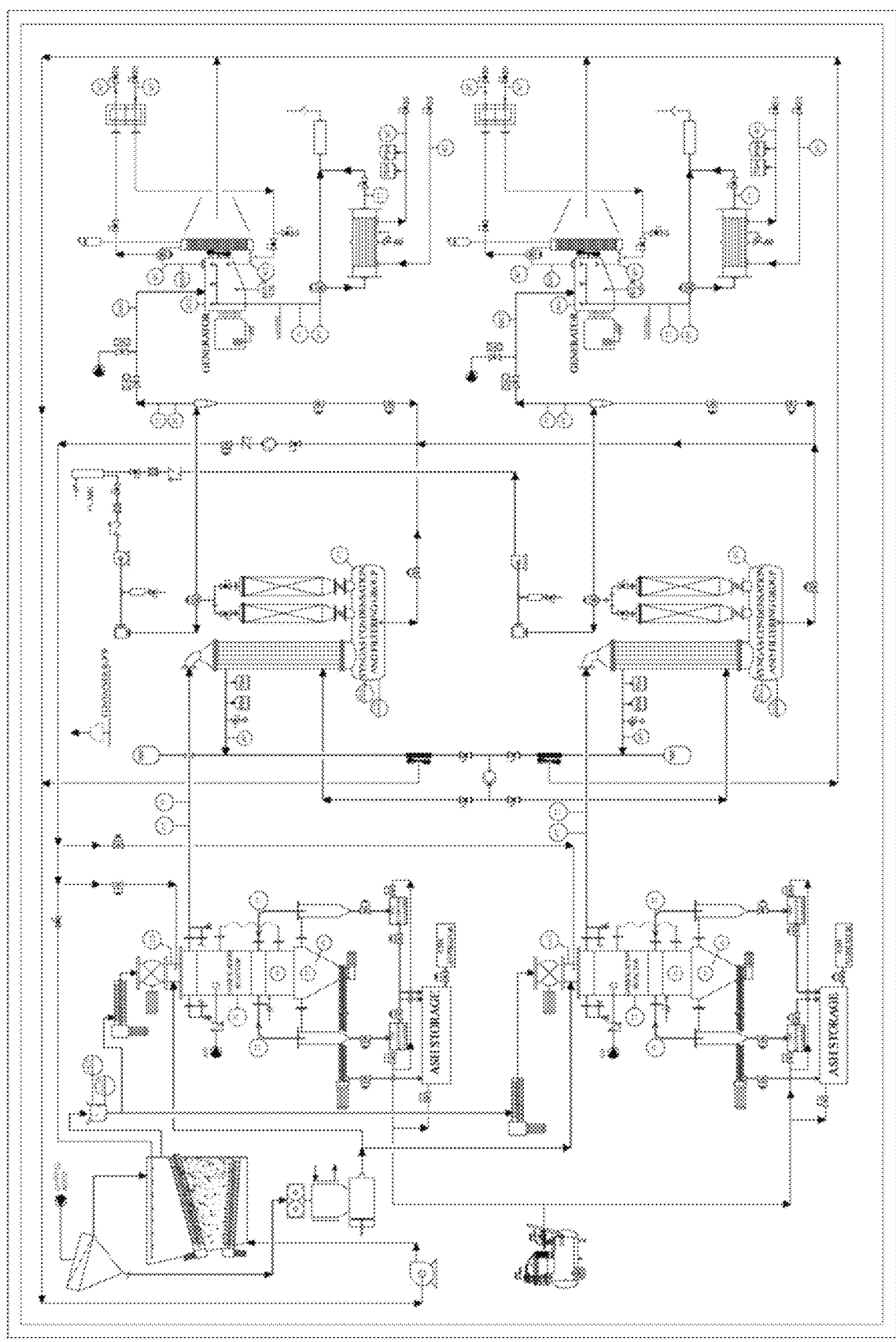

FIG. 6 shows the syngas production line from the gasification reactors 7 to the condensation system 11 and the filtering system 12;

FIG. 7 and FIG. 8 both show a detailed perspective view of the spatial configuration of some of the components of the present cogeneration plant. The following can be observed: the flare 17, the condensation system 11, the filtering system 12, the sealed extraction system 10 for the biochar, and the recovery chamber 13 for the tar;

FIG. 9 shows a perspective view of the production line of thermal recovery hot water from the exhaust gases of the motors, through exchangers and tubes, and the recovery of hot air to the benefit of the woodchips dryer;

FIG. 10 shows a perspective view of the syngas line from the groups of the condensation 11 and filtering 12 system to the blowers and the emergency flare 17;

FIG. 11 shows a perspective view of the syngas line from the condensation and filtering groups to the motors 14. Also indicated is the presence of three-way valves 16 for allowing the selection of flare or motor mode for the path of the syngas produced with the plant 100;

FIG. 12 shows an enlarged and detailed perspective view of the integrated condensation and filtering groups;

FIG. 13 shows a detailed perspective view of the closed system of re-gasification of the condensate;

FIG. 14 shows a perspective view of the hydraulic cooling circuit for the syngas, from heat exchangers of the condensation and filtering groups to the circulator and radiator;

FIG. 15 shows the instrumented process diagram for the interconnection between the apparatuses of the process.

In its preferred embodiment, the cogeneration plant 100 comprises at least two containers and in particular at least one first container 1' adapted to contain the components that provide for the production of the syngas necessary for the conversion of mechanical energy into electrical energy, and at least one second container 1", connected to said first container 1', and set for containing the electric current generators, the electrical board, as well as for receiving the optional operator station.

More in detail, the first container 1' contains the necessary components for inducing the endothermic transformation of the woody precursor for obtaining chemical substances of interest such as $H_2$ and CO useful in the electric current production process starting from the mechanical energy generated by a specific endothermic motor or motors, comprised in said plant 100 and suppliable with said gaseous substances.

Before entering into the detailed description of the present invention, it must be indicated that the latter is in primis characterized by the particular nature of providing a starting substrate, i.e. the woody material biomass, with optimal characteristics for inducing a conversion free of all the problems currently existing in cogeneration plants which use wood as solid starting biomass. More specifically, said plant 100 is characterized in that it comprises in situ a particular section for the screening, drying and for the formulation of the woody material in specific wood briquettes suitably shaped for the optimization of the production process of the syngas of interest, i.e. for the production of $H_2$ and CO. Said plant also provides that the suitably screened and formulated material is also rendered qualitatively excellent for its conversion due to a very low humidity content; as is known, humidity is one of the primary causes of malfunctioning of such plant type using wood biomasses, and consequently of their commercial failure.

It also must be indicated that the components which allow formulating the woody precursor in briquettes and minimizing the water content synergistically cooperate: the insertion of screened and "dried" material inside the component briquette machine, integrated with said plant 100, allow the latter to make briquettes whose weight is constant over time, allowing not only the correct estimation of the quantity of solid biomass actually used that is useful for the transformation, but also preventing the possible spontaneous removal of water from the biomass in briquette form, in the absence of previous drying, from leading to the structural instability of the briquette itself which could even crumble under the effect of any one weak mechanical stress. The presence of water within the solid biomass during the step of formulation in briquettes would moreover induce an incorrect evaluation of the pressure to be applied in order to obtain a briquette of predefined size, since water in the liquid state is well-known to be incompressible. Hence, we would have a briquette which macroscopically has the desired size but micro-structurally could comprise volumes of water. The spontaneous removal of the water, for example caused by an increase of the temperatures, would thus determine a structure having cavities (which would be formed following the removal of the water from the body of the briquette) which as stated above could compromise the structural stability of the briquette as well as lead to the loss of the effective parameters such as weight, size, etc., previously established for a specific cycle of the plant.

Substantially, the cogeneration plant 100, object of the present invention, differs from those known due to the fact that it comprises in situ an integrated system for the screening, the drying and the formulation of the solid biomass in briquettes used as fuel. The precursors of the briquettes intended for the production of the syngas, i.e. for the production of the fuel formed by $H_2$ and CO useful in the subsequent process steps, can be biomasses such as: wood in the form of woodchips, vine branches, shrubs and underbrush, grain, hay, animal litter, suitably-treated muds, shells and kernels, suitably-treated husks, fibrous cultures and other materials with similar properties.

The present cogeneration plant 100 is therefore adapted for the continuous production of electricity and heat by making use of syngas produced in suitable gasification reactors with fixed bed of downdraft type, integrated and loaded with the solid biomass that has been previously treated and formulated for an optimal performance thereof. Such optimal performance is obtainable due to the particular components of the system which, as mentioned several times above, characterize the object of the invention.

As mentioned above, said cogeneration plant 100 comprises at least one first container 1' and at least one second container 1" connected to said first container 1' by means of an interconnection duct 1'''.

Said first container 1' comprises at least one first section for storing in which also the drying, screening and formulation of the solid biomass in briquettes, represented by woodchips, occurs; at least one second section for the production of syngas by means of suitable gasification reactors; at least one third section of endothermic motors supplied with the fuel previously synthesized in said gasification section; and at least one fourth section for the total thermal recovery.

More specifically, said first section for screening, and arranging the biomass for its conversion, comprises at least one tub-like tank 2 where the woodchips are loaded which—due to the particular integration of a system for drying with preheated forced air—is normalized to a humidity value less than or at most equal to 10% by weight. Still more specifically, said drying occurs due to a dryer 3 thermo-ventilated with hot air from hot water. Said first section further comprises a three-way vibrating sieve 4 adapted to allow the portion of fine material that passes through the sieves, i.e. the under-sieve, to be automatically unloaded in an underlying grinder 5 which prepares the material for the subsequent step of briquette-making. Said briquette-making step occurs due to a suitable integrated briquette machine 6, also comprised in said first section.

Said second section for the gasification of the biomass comprises at least one reactor 7, preferably at least two reactors 7, still more preferably three gasification reactors 7 with fixed bed of downdraft type with geometries and processes optimized for limiting the production of the condensates. Said second gasification section also makes use of a sealed load system 8 represented, by way of a non-limiting example, by a rotovalve; of a cyclone extraction system 9 for the syngas; and of a sealed extraction system 10 for the biochar which is obtained as further product of the gasification of the starting biomass. It should be indicated that the quantity of biochar produced can be recovered in order to then be destined for other uses. For example, as amendment in the soil, since its benefits for such application are well-known.

The second section of gasification of the plant 100 further comprises a condensation system 11 for cooling the substances produced from the gasification step, and a filtering system 12 for purifying the syngas. It must be indicated that an essential recovery chamber 13 is integrated with said condensation 11 and filtering 12 system. Such essential recovery chamber 13 is adapted to collect the highest boiling point substances produced in the gasification reactor and suitably cooled in said condensation system in order to then precipitate inside said recovery chamber 13. Otherwise, the gaseous substances and in particular the syngas of $H_2$ and CO continue their travel through said filtering system 12. The third section of endothermic motors comprises at least one syngas motor 14 with suitably modified diesel cycle, with known expedients, calibrated for the specific bio-syngas biomass fuel.

The fourth section of thermal recovery comprises a set of components and of ducts that—when suitably arranged and configured spatially with known expedients—allow recovering the heat developed by the syngas production process and by syngas combustion with the aforesaid motors 14. More in detail, said fourth section provides that the heat production sources that are generated during the operation of the plant 100 are recovered and used. Still more in detail, said fourth section provides that: when generated, the heat of the syngas is first of all transferred to the pyrolysis zone of the gasification reactor 7; subsequently, the condenser of the condensation system 11, associated with said system of filters 12, recovers other heat which comes to irradiate the nearby storage in order to dry the solid woodchips biomass, together with the irradiation heat of the gasification section, of the reactors and of the motors. Said fourth section further provides that the heat of the cooling liquid of the motors and of the exhausts is recovered with, by way of a non-limiting example, two water-water and water vapor exchangers, and such heat is brought to the flanges (terminals) in order to be provided to the users.

The operating process for the plant 100, also the object of claim of the present industrial invention patent application, therefore comprises at least the following steps:

a) The introduction of the raw material, hence of the solid woody biomass in the first section for storing, screening, drying and briquette-making the biomass, within the tank 2 of the first container 1;

b) The transfer of said biomass, suitably treated, within at least one load hopper 15 (e.g. with a screw system), and the transfer of the biomass from said hopper 15 to the gasification reactor 7 by means of said sealed load system 8 represented, by way of a non-limiting example, by a rotovalve;

c) The gasification of the solid biomass (through the passages of combustion pyrolysis and reduction of the gasification process itself) inside the reactor 7;

d) The outflow of the gas produced by the gasification from said reactor 7 and its passage through a cyclone extraction system 9 adapted to execute a separation of the gaseous portion of the biogas (in the lower part of the reactor 7), which is re-inserted in said reactor 7, from the by-product represented by biochar (2 to 5% by weight of the initial biomass). The latter is suitably recovered and preserved for other uses, for example as amendment for the soil; said recovery occurs with a sealed extraction system 10;

e) The outflow of the gaseous substances from the reactor 7 and their passage both in an condensation system 11 for cooling the substances produced from the gasification step, and in a filtering system 12 for purifying the syngas. The passage through said condensation system 11 allows the precipitation of the substances with higher molecular weight which will be recovered within a suitable recovery chamber 13. The recovered material comprises complex mixtures of substances such as phenols, aromatic polycyclic hydrocarbons and various heterocyclic compounds. Said mixture of substances with high molecular weight, which commonly define the "coaltar", is recovered in order to then be conveyed into the first section of the first container 1' of the plant 100 and "admixed" with the biomass. As will be explained in the course of the present description, this aspect offers a further synergistic contribution to some steps of the process of the plant 100, which optimizes the effectiveness and operation thereof;

f) The outflow of the syngas, comprising $H_2$ and CO, from the filtering system 12, and the passage of said syngas into a three-way valve 16 which allows managing the plant 100 in two modes: flare or motor. More specifically, said syngas, by means of said three-way valve 16, can be conveyed to a flare 17, or continue its travel in order to reach the motor(s) 14;

g) The transformation of the mechanical energy produced by said motor 14 into electrical energy by means of suitable electrical generators preferably inside said second container 1" connected to first container 1', by means of the interconnection duct 13 which also allows the connection of said motors 14 with the electricity generators.

As described above, all of the heat produced by the components of the system is recovered in order to then be conveyed to the solid starting biomass for its drying and in order to be supplied to users.

As with the cogeneration plant 100, the process for producing thermal and electrical energy, using H2 and CO syngas starting from solid woody material biomass, is characterized in that it comprises a particular step for screening, drying and formulation of the woodchips in briquettes, due to specific components integrated with the system in the first section of the first container 1' of the plant 100. As described above, said components synergistically cooperate since the previous step for screening and drying the woodchips "on board the machine", before said biomass is inserted in the briquette machine 6, allow obtaining briquettes having optimal characteristics—both regarding the structural stability of the briquette and regarding its water content which is less than or equal to 10% by weight. Thus, it is possible to avoid all the problems associated with the presence of water in the substrate to be converted, as currently occurs for the cogeneration plants which use solid biomass made of woody material.

More specifically, at the head of the woodchips loading section, a three-way vibrating sieve 4 is installed: the portion of fine material that passes through the sieves (under-sieve) is automatically unloaded onto the underlying grinder 5, which prepares the material for the subsequent briquette-making step. The part of raw material with suitable size (over-sieve) is fed to the tank in order to be dried on board. The screening also provides for a system for "trapping" and unloading the larger wood pieces (normally a small amount) which could lead to jamming of the transportation members, while the further presence of a deferrization machine prevents the access to "intrusive" metal parts. The divided material then proceeds to the step of drying within the grinder 5 due to the hot air produced by the machine itself and, when a suitable humidity sensor gives permission, such material is fed to the briquette-making step. From here, the briquettes, made in the pre-established size, are pumped directly to the gasification reactors. In such a manner, 99% of the wood biomass is used and there are no significant discards.

In substance, the plant 100 integrates in the tub-like tank 2 the functions of drying, screening and briquette-making of the wood of unsuitable size for being fed to the gasification section. What results is a transformation section on board the machine, perfectly integrated in said first container 1' and manageable in an automated manner.

In the course of the experimentation pertaining to the present invention, it has also been surprisingly found that the recovery of the tar, from the step of condensation and filtering of the syngas exiting from the gasification reactor, and in particular its conveying within the ducts of the plant in order to arrive inside the tub-like tank 2 containing the woodchips, consistently improves the performances of the briquette for its subsequent conversion into syngas. More specifically, it was observed that the presence of the viscous liquid based on high molecular weight hydrocarbons not only improves the compactness of the briquette, which is intuitive since the "bonding" properties of such mixtures are known, but above all optimizes the conversion of the biomass into syngas, increasing the yield of the gaseous products of interest, thus exerting a synergistic action with the step of formulation of the briquette, which becomes more compact, and with the gasification step involving a greater yield of the products of interest.

One probable explanation could be traced to the fact that said carbonaceous liquid could, by being admixed with the woodchips, be adsorbed or be bonded in various ways with the surface of the solid biomass, with the effect of making some chemical species and groups (present in the molecular structures thereof) more available (in the "bonded" form thereof) for their elimination from the molecular structures thereof, thus facilitating a probable increase of the CO and $H_2$ produced and an overall increase of the yield of the syngas production process.

Said process, and in particular said step e) of the process associated with the plant 100, therefore allows obtaining briquettes which, being admixed with the tar produced and recirculated by the plant, have improved characteristics in terms of performance for their conversion during the subsequent gasification step.

The steps of the plant operating process also provide for many expedients, in line with that required by the gasification and in particular: continuous control of the humidity of the wood before the briquette-making; vacuum system over the entire grinding and briquette-making line so as to facilitate the removal of the humidity and allow feeding the briquette in line without altering the operation of the reactors 7; system of tubes for pumping the briquette directly to the reactors; feeding regulation and control functions (woodchips/briquette ratio) based on selection criteria to be set on the basis of the availability of the material, or based on predefined criteria; sensors for detecting possible jamming and systems for the automatic resolution thereof.

The first section of the present cogeneration plant 100 therefore provides for: the optimization of the selection of the woodchips and the automatic loading of the wood with size perfectly suitable for the gasification plant; cycles of selection, grinding and briquette-making synchronized with each other and regulated as a function of the continuous production of the machine; the separate and regulated feeding, according to various modes (automatic, manual and simultaneous), of the woodchips in briquette form; the integration of all the parts inside the container so as to provide a plug & play plant solution.

The entire process can also be controlled and automated in its entirety.

As mentioned above, the plant 100 comprises a flare 17 which allows, in case of emergency or maintenance stop of the motors, the production of syngas to be diverted to said flare in order to be burned. The flare 17 is provided with a hydraulic guard in order to prevent accidental flame returns and with a pilot burner for the lighting of the syngas in the terminal step at elevation.

The plant 100 further comprises a system for the exhaust of the fumes and emissions. More in detail the emissions only occur through the catalytic muffler of the motor and are within the legal limits provided by global law.

As mentioned several times above, the plant 100 and the relative operating process are characterized by the particular integration of the components, synergistically cooperating, for the drying, the screening and the briquette-making on board the machine for the biomass fuel, and for the further synergistic contribution offered by the reuse of the tar, produced following the step of condensation and filtering of the syngas by the reactor, in order to be admixed with the starting biomass, surprisingly improving the properties thereof for its conversion into syngas.

In the course of the present description, emphasis has therefore been given to the aforesaid aspects characterizing the invention, thus omitting all the structural characteristics and expedients that are known, such as sensors, valves, manostats, pressure reducers, etc. and various lever systems, which are still comprised in the plant 100. It is thus taken for granted that the man skilled in the art understands the presence of these items; it is clarified that the essence of the invention and its inventive character lie in the aspects that were outlined above.

Nevertheless, for the purpose of providing greater detail of the description of the structural characteristics of the cogeneration plant 100 according to the present invention, hereinbelow a non-limiting list has been provided of some of the components used for achieving the plant in one of its preferred embodiments.

Said plant further comprises at least the following components:

- a synchronous alternator, low-voltage, self-excited, without brushes, four poles, 400 V, 50 Hz, three-phase with neutral. Automatic voltage regulator, automatic power factor regulator;
- steel base, anti-vibrating supports, accumulators for starting;
- prime motor feed gas ramp with solenoid valves, pressure regulator, filter, safety manostats;
- thermal recovery module for the production of hot water complete with heat exchanger, glycol water-water, of plate type, vapor-water tube heat exchanger, vapor by-pass of on/off type, primary water pump, valves, insulated tubes, pressure probes, temperature probes, protections as provided by law;
- exhaust gas silencer of residential removal type 45 db (A);
- electrical board operating in parallel with the national power grid;
- container of 6.0 meters length, 2.4 meters width and 2.6 meters height;
- ventilation openings with anti-dust filters, anti-intrusion net and soundproofing labyrinths;
- light beacons.

As already described, the cogeneration plant 100 can comprise one or more gasification reactors. Typically, but not exclusively, two gasification reactors, or three gasification reactors in accordance with the various embodiments of the plant 100. This aspect is therefore associated with the presence of at least two gas production lines and at least two cogeneration groups. Advantageously, such characteristic allows not completely stopping the plant during the necessary maintenance steps. More in detail, with regard to the 50 kW machine, this is made by two identical lines so that it is possible to turn off one of the two without having to turn off the other. When the power is 100 kW, the plant typically comprises three reactors and two motors, thus advantageously allowing the rotation of the maintenance activities on each of the components independently.

These characteristics of the present plant above all impact the thermal energy production of the plant: the users thus have continuity in the thermal energy administration, even if with reduced power, during maintenance periods. For some installations, this aspect can be very advantageous (for example for sports facility installations). The overall electrical production increases slightly, since in the periods of operation with only one line it is possible to exploit the power margin, producing up to 65% of the nominal power. Also for the electrical power, there still remains a supply continuity which for uses "off-grid" can be important.

It should also be indicated that for all the embodiments according to the present invention, the structural and support expedients for the various elements comprised in the plant and mounted within the container allow the transportation of the plant on normal container carrier means. In addition, the plant 100 has been tested in order to be used in a category 1 seismic zone.

The invention claimed is:

1. A cogeneration plant (100) for the continuous production of electrical and thermal energy from solid woody biomass comprising woodchips, vine branches, shrubs and underbrush, grain, hay, animal litter, treated muds, shells and kernels, treated husks, fibrous cultures, and compositions thereof, said plant (100) comprising:
   at least one first container (1') and
   at least one second container (1") connected to the at least one first container (1') by at least one interconnection duct (1'''),
   said first container (1') comprising:
      at least one first section for storing the solid woody biomass, said first section comprising:
         a tank in the shape of a tub (2);
         a dryer (3);
         a three-way vibrating sieve (4);
         a grinder (5); and
         an integrated briquette machine (6);
            wherein said three-way vibrating sieve (4), said dryer (3), and said integrated briquette machine (6) cooperating to form a system for drying, screening, and formulating the solid woody biomass into briquettes;
      at least one second section for the transformation of said solid woody biomass into syngas comprising H2 and CO by means of at least one gasification reactor (7);
      at least one third section comprising at least one endothermic motor (14) adapted to produce mechanical energy convertible into electrical energy and supplied with the syngas synthesized in said second section; and
      at least one fourth section comprising means for total thermal recovery;
   said second container (1") comprising at least one electric current generator and at least one electrical board;
   wherein said cogeneration plant (100) has nominal power up to hundreds of kW.

2. The cogeneration plant (100) of claim 1, in which the second section further comprises:
   at least two gasification reactors (7) with fixed bed of downdraft type;
   at least one sealed load system (8) for the previously dried and formulated biomass, represented by a rotovalve;
   at least one cyclone extraction system (9) for the syngas;
   at least one sealed extraction system (10) for a biochar obtainable by gasification of said solid woody biomass;
   at least one condensation system (11) for cooling substances produced by the gasification step;
   at least one filtering system (12) for purifying the syngas;
   at least one recovery chamber (13) adapted to recover the highest boiling point substances produced in said gasification reactor (7), said substances having tar form and being conveyable towards the solid woody biomass.

3. The cogeneration plant (100) of claim 2 in which the fourth section comprises a set of ducts suitably spatially configured for the recovery of heat developed in the second section by combustion of the syngas with said motors (14) and by the condensation system (11) associated with the filtering system (12), the recovered heat being adapted to irradiate the first section in order to contribute to drying of the solid woody biomass, wherein heat from cooling liquid for the at least one endothermic motor is recovered with two water-water and water vapor exchangers and brought to terminals in order to be supplied to users.

4. The cogeneration plant (100) according to claim 3, comprising two production lines of the syngas and two cogeneration groups, said plant (100) having a nominal power of 50 kW.

5. The cogeneration plant (100) of claim 1 in which the third section comprises at least one motor (14) with a modified diesel cycle and calibrated for said syngas.

6. The cogeneration plant (100) according to claim 5 in which the fourth section comprises a set of ducts suitably spatially configured for the recovery of heat developed in the second section by combustion of the syngas with said motors (14) and by the condensation system (11) associated with the filtering system (12), the recovered heat being adapted to irradiate the first section in order to contribute to drying of the solid woody biomass, wherein heat from cooling liquid for the at least one endothermic motor is recovered with two water-water and water vapor exchangers and brought to terminals in order to be supplied to users.

7. The cogeneration plant (100) according to claim 5, comprising two production lines of the syngas and two cogeneration groups, said plant (100) having a nominal power of 50 kW.

8. The cogeneration plant (100) according to claim 5 comprising three gasification reactors (7) and two endothermic motors (14), said plant (100) having nominal power of 100 kW.

9. The cogeneration plant (100) according to claim 2 in which the third section comprises at least one motor (14) with a modified diesel cycle and calibrated for said syngas.

10. The cogeneration plant (100) according to claim 2, comprising two production lines of the syngas and two cogeneration groups, said plant (100) having a nominal power of 50 kW.

11. Woodchips in the form of briquettes obtainable with the plant (100) according to claim 1, wherein the plant is used to perform a step of introducing the woodchips into the first section of storage, screening, drying and briquette-making of the biomass, within the tub-like tank (2) of the first container (1'); and
  outflowing the gaseous substances from the reactor (7) and their passage inside both a condensation system (11) for the cooling of the substances produced by the gasification step, and in a filtering system (12) for purifying the syngas, said passage allowing the precipitation of the substances with higher molecular weight which will be recovered inside a suitable recovery chamber (13), said substances with higher molecular weight being recovered in order to then be conveyed into the first section of the first container (1') of the plant (100) and admixed with the biomass;
  said briquettes being further admixed with tar coming from the cycles of said plant (100).

12. The cogeneration plant (100) according to claim 2 comprising three gasification reactors (7) and two endothermic motors (14), said plant (100) having nominal power of 100 kW.

13. The cogeneration plant (100) according to claim 1, comprising two production lines of the syngas and two cogeneration groups, said plant (100) having a nominal power of 50 kW.

14. The cogeneration plant (100) according to claim 1 comprising three gasification reactors (7) and two endothermic motors (14), said plant (100) having nominal power of 100 kW.

15. A process for the continuous production of electrical and thermal energy starting from woodchips, said process making use of the cogeneration plant (100) according to claim 1, said process providing for:
  a) the introduction of the woodchips into the first section of storage, screening, drying and briquette-making of the biomass, within the tank (2) of the first container (1');
  b) the transfer of said biomass, suitably treated, inside at least one load hopper (15), and the transfer of the woodchips from said hopper (15) to at least one gasification reactor (7) by means of said sealed load system (8) represented by a rotovalve;
  c) the gasification of the solid biomass inside the reactor(s) (7);
  d) the outflow of the gas produced by the gasification from said reactor(s) (7) and its passage through a cyclone extraction system (9) adapted to execute a separation of the gaseous portion of the biogas from the by-product represented by biochar; said separation occurring with a sealed extraction system (10);
  e) the outflow of the gaseous substances from the reactor (7) and their passage inside both a condensation system (11) for the cooling of the substances produced by the gasification step, and in a filtering system (12) for purifying the syngas, said passage allowing the precipitation of the substances with higher molecular weight which will be recovered inside a suitable recovery chamber (13), said substances with higher molecular weight being recovered in order to then be conveyed into the first section of the first container (1') of the plant (100) and admixed with the biomass;
  f) the outflow of the syngas, comprising $H_2$ and CO, from the filtering system (12), and the passage of said syngas into a three-way valve (16) that allows managing the plant (100) in two modes: flare or motor, said three-way valve (16) allowing the conveying of the syngas to a flare (17), or the continuation of its travel in order to reach the motor(s) (14);
  g) the transformation of the mechanical energy produced by said motor(s) (14) into electrical energy by means of suitable electrical generators;
    wherein in said step a) the portion of fine material that passes through the sieves of the vibrating sieve (4) is directly unloaded by the grinder (5) below, which prepares the material for the subsequent briquette-making with the briquette machine (6); the raw material part representing the over-sieve is fed to the tank in order to be dried on board; the briquettes, made with pre-established size, are directly pumped to the gasification reactors (7).

16. The process of claim 15, wherein in step g) the electrical generators are placed inside said second container 1" connected to the first container 1' by means of the interconnection duct 13 which also allows the connection of said motors 14 with the electricity generators.

17. Woodchips in the form of briquettes obtainable with the plant (100) according to claim 1, wherein the plant is used to perform a step of introducing the woodchips into the first section of storage, screening, drying and briquette-making of the biomass, within the tub-like tank (2) of the first container (1'); wherein said briquettes have diameter comprised between 2 and 6 cm and thickness comprised between 0.5 cm and 4.5 cm and a water content less than or equal to 10% by weight.

18. Woodchips in the form of briquettes according to claim 17, said briquettes having diameter of 4 cm and thickness of 3 cm.

19. A method for producing electrical and thermal energy from syngas comprising $H_2$ and CO, comprising burning the woodchips in the form of briquettes of claim 18.

* * * * *